(12) United States Patent
Ajdari Rad et al.

(10) Patent No.: US 9,410,215 B2
(45) Date of Patent: Aug. 9, 2016

(54) COLLOID PRODUCT, METHOD FOR PRODUCING SAME AND USE THEREOF

(75) Inventors: Mohsen Ajdari Rad, Obrigheim (DE); Stefan Frenzel, Weinheim (DE)

(73) Assignee: SUDZUCKER AKTIENGESELLSCHAFT MANNHEIM/OCHSENFURT, Mannheim (DE)

(*) Notice: Subject to any disclaimer, the term of this patent is extended or adjusted under 35 U.S.C. 154(b) by 342 days.

(21) Appl. No.: 13/876,790

(22) PCT Filed: Sep. 14, 2011

(86) PCT No.: PCT/EP2011/004609
§ 371 (c)(1),
(2), (4) Date: Mar. 28, 2013

(87) PCT Pub. No.: WO2012/045388
PCT Pub. Date: Apr. 12, 2012

(65) Prior Publication Data
US 2013/0239635 A1    Sep. 19, 2013

(30) Foreign Application Priority Data

Oct. 8, 2010 (DE) .................. 10 2010 047 995
Nov. 22, 2010 (DE) .................. 10 2010 051 879

(51) Int. Cl.
*A23J 1/00* (2006.01)
*A23G 3/02* (2006.01)
(Continued)

(52) U.S. Cl.
CPC . *C13B 20/16* (2013.01); *A23J 1/14* (2013.01); *C13B 20/00* (2013.01); *Y02E 50/10* (2013.01); *Y02E 50/30* (2013.01)

(58) Field of Classification Search
CPC .......... A23J 1/14; C13B 20/00; C13B 20/16; Y02E 50/30; Y02E 50/10
USPC ............................ 426/512, 655, 656; 71/23
See application file for complete search history.

(56) References Cited

U.S. PATENT DOCUMENTS 7,955,635 B2   6/2011   Deneus et al.
8,328,948 B2   12/2012  Rad et al.
(Continued)

FOREIGN PATENT DOCUMENTS

CN    1104440 A    7/1995
CN    1456530 A    11/2003
(Continued)

OTHER PUBLICATIONS

Office Action regarding corresponding Japan Patent Application No. 2013-532059 dated Jul. 1, 2014.
(Continued)

*Primary Examiner* — Erik Kashnikow
*Assistant Examiner* — Assaf Zilbering
(74) *Attorney, Agent, or Firm* — Stephen T. Olson; Harness, Dickey & Pierce, P.L.C.

(57) ABSTRACT

A method for producing a molded product of a protein-containing fraction from raw sugar beet juice includes: pre-liming the raw sugar beet juice in order to form a coagulum of non-sucrose substances forming in the obtained pre-liming juice, separating the coagulum from the pre-liming juice using at least one first separation device in order to obtain a protein-containing fraction, blending the protein-containing fraction with at least one carrier, and molding the obtained mixture comprising the protein-containing fraction and the carrier in a molding device to obtain a molded product of a protein-containing fraction.

18 Claims, 2 Drawing Sheets

(51) Int. Cl.
*A23K 1/18* (2006.01)
*A23L 1/28* (2006.01)
*C13B 20/16* (2011.01)
*B09B 3/00* (2006.01)
*A23J 1/14* (2006.01)
*C13B 20/00* (2011.01)

(56) References Cited

U.S. PATENT DOCUMENTS

| | | |
|---|---|---|
| 2008/0017187 A1* | 1/2008 | Deneus et al. .................... 127/9 |
| 2009/0007902 A1 | 1/2009 | Ajdari Rad et al. |
| 2010/0043783 A1 | 2/2010 | Frenzel et al. |
| 2010/0178403 A1 | 7/2010 | Rad et al. |
| 2011/0214669 A1 | 9/2011 | Deneus et al. |
| 2013/0056002 A1 | 3/2013 | Rad et al. |

FOREIGN PATENT DOCUMENTS

| | | |
|---|---|---|
| DE | 10 2006 004103 A1 | 8/2007 |
| DE | 10 2007 003463 A1 | 7/2008 |
| EP | 0 073 844 A1 | 3/1983 |
| JP | S51-85972 A | 7/1976 |
| JP | 2002331300 A | 11/2002 |
| WO | WO 2004076696 A1 * | 9/2004 |
| WO | WO 2005/042787 A1 | 5/2005 |

OTHER PUBLICATIONS

International Search Report (English and German) and Written Opinion of the ISA (German) for PCT/EP2011/004609, ISA/EP, mailed Feb. 9, 2012.

First Office Action and Search Report regarding China Patent Application No. 201180048649.5 dated Jan. 10, 2014.

International Preliminary Report on Patentability regarding Application No. PCT/EP2011/004609 dated Apr. 9, 2013.

* cited by examiner

COLLOID PRODUCT, METHOD FOR PRODUCING SAME AND USE THEREOF

CROSS-REFERENCE TO RELATED APPLICATIONS

This application is a 371 U.S. National Stage of International Application No. PCT/EP2011/004609, filed Sep. 14, 2011. This application claims priority to German Patent Application Nos. DE 102010047995.0, filed Oct. 8, 2010, and DE 102010051879.4, filed Nov. 22, 2010. The disclosures of the above applications are entirely incorporated herein by reference.

FIELD

The present invention relates to a method for producing a molded product of a protein-containing fraction from raw sugar beet juice, the molded products themselves produced by means of this method, and the use thereof for ensiling, as animal feed, as fermentation medium, as a combustion aid, as fuel, as a soil conditioner or fertilizer.

BACKGROUND

Usually, sugar is obtained from beets by first cleaning the harvested beets, wherein they are cleaned from a large part of the still adhering soil and leaf residues. After passing a washing process, the beets are planed in cutting machines into pencil-sized slices. From the slices, sugar is produced through counterflow extraction using hot, slightly acidified water. By acidifying the extraction liquid, filtration of the raw sugar beet juice and the pressing properties of the extracted slices are improved. The raw sugar beet juice obtained during the extraction is subsequently fed to an extract purification process. Usually, the extract purification takes place with the aid of the so-called lime-and-carbonic-acid extract purification in the form of a pre-liming and a main liming process and also a first and second carbonation and the separation of the precipitation after the first and second carbonatations. The purpose of the extract purification is to largely remove the non-sucrose substances, in particular high-molecular substances, contained in the sugar beet juice. The non-sucrose substances to be removed should not be degraded here, if possible, so that no additional low-molecular substances get into the extract or raw sugar beet juice.

During pre-liming, the raw sugar beet juice is gradually alkalized under gentle conditions by adding lime milk. Pre-liming is carried out by adding defined amounts of calcium hydroxide (lime milk). Due to the alkaline treatment of the raw sugar beet treatment, neutralization of the organic and inorganic acids present in the extract as well as precipitation reactions of the anions, which form with calcium insoluble or hardly soluble salts, take place. Thus, for example, phosphate, oxalate, citrate and sulfate are precipitated to the greatest possible extent. Moreover, colloidally dissolved non-sucrose substances coagulate and are precipitated. The precipitation of individual ingredients, for example, of anions such as oxalate, phosphate, citrate, sulfate or of colloids such as pectin and proteins, takes place within certain pH ranges. Within these pH ranges, densification of the precipitation takes place at the same time. By adding lime milk during pre-liming, coagulation of protein takes also place. Due to this protein content, the aforementioned non-sucrose substances are also designated as protein-containing fraction from raw sugar beet juice.

SUMMARY

The object of the subsequently performed main liming by adding lime milk is in particular the chemical degradation of invert sugar and acid amides, which otherwise would take place during the juice thickening process, thereby forming acids. The lime milk added during main liming also plays an important role during the first and second carbonatations. Through conversion to calcium carbonate, a strong adsorbent for a number of soluble non-sucrose substances and also a suitable filter aid is provided. By introducing carbon dioxide, the lime milk that is not consumed in the main liming process is converted as carbonatation gas in the two carbonatations steps into calcium carbonate. Carbonatation takes place in two steps. During the first carbonatation, the precipitated and flocculated non-sucrose substances and a portion of the dyes contained in the raw sugar beet juice are adsorptively bound to the formed calcium carbonate. The so-called first carbonatation juice obtained in the first carbonatation is filtered or fed through decanters and is thereby concentrated to form a carbonatation juice concentrate. In the subsequent second carbonatation, the so-called second carbonatation juice is formed, which is also filtered and thereby concentrated. The calcium carbonate slurries (carbonatation juice concentrate) concentrated in the first and second carbonatations are usually combined and pressed. Thereby, the so-called carbo-lime is formed. This carbo-lime is a storable product that has a dry matter content of more than 70%. The raw sugar beet juice purified during the extract purification is further processed and white sugar is obtained.

A significant disadvantage of the conventional lime-and-carbonic-acid extract purification is in particular that only a relatively small purification effect is achieved since only a maximum of 40% of all non-sucrose substances are removed from the raw sugar beet juice. Another disadvantage is that this method requires large amounts of lime milk. However, the production of the lime milk used in the lime-and-carbonic-acid extract purification method and disposal of waste occurring during the production of burnt lime are relatively expensive. Also, the $CO_2$ emissions from the lime kiln and juice purification system are very high. Moreover, the carbo-lime resulting from the lime-and-carbonic-acid extract purification method, which carbo-lime consists of lime and separated juice contaminants, can only be used as fertilizer.

In order to avoid this technical problem, methods for extract purification of raw sugar beet juice are known from EP 1 682 683 A, said methods comprising the following method steps, namely pre-liming the raw sugar beet juice by adding lime milk for precipitating and/or coagulating non-sucrose substances, thus the protein-containing fraction, adding at least one flocculant, separating the coagulum from the pre-liming juice using at least one first separating device thereby obtaining clear pre-liming juice, main liming the clear pre-liming juice obtained after separating the coagulum by adding lime milk, and carrying out a first and optionally a second carbonatation.

Thus, in contrast to the usual methods, this method provides that the protein-containing fraction precipitated or coagulated during pre-liming is separated already after pre-liming and not only after the first and second carbonatations. The concentrated protein-containing fraction obtained in this manner can be homogenized or mixed with other components and homogenized. However, the protein-containing fraction obtained in this manner still has a comparatively high and undesirable moisture content which significantly limits the stability of this product and therefore also the possible uses. The product is sticky and inhomogeneous.

The present invention is therefore based on the technical problem to provide a method and products by means of which the aforementioned disadvantages are overcome, in particular to provide a method by means of which from a protein-containing fraction of a raw sugar beet juice, a homogeneous, storage-stable and dried product can be obtained which is suitable for a multiplicity of uses, in particular for commercially interesting uses.

The present invention solves the underlying technical problem by providing the teaching of, in particular, the main claims. In particular, the present invention solves the underlying technical problem by providing a method for producing a molded product of a protein-containing fraction from raw sugar beet juice, comprising the method steps a) pre-liming the raw sugar beet juice in order to form a coagulum of non-sucrose substances forming in the obtained pre-liming juice, b) separating the coagulum obtained in step a) by using at least one first separation device in order to obtain a protein-containing fraction, c) blending the protein-containing fraction obtained in step b) with at least one carrier, and d), molding the mixture, obtained in step c), of the protein-containing fraction and the carrier in a molding device so as to obtain the molded product of a protein-containing fraction.

The present invention solves the underlying technical problem also by providing a molded product that can be obtained by means of the method according to the invention.

The invention thus provides in an advantageous and surprising manner a method in which in a first method step a raw sugar beet juice is pre-limed resulting in a pre-liming juice, and wherein from the non-sucrose substances contained in the raw sugar beet juice, a coagulum forms which accordingly is contained in the pre-liming juice obtained by pre-liming the raw sugar beet juice. In a further method step, the invention provides to separate the coagulum from the pre-liming juice, wherein for this purpose a first separation device is used, and wherein a protein-containing fraction in the form of the coagulum is obtained. In a subsequent method step, the obtained protein-containing fraction is blended with at least one carrier, in particular blended so as to form a homogeneous mixture, and in a subsequent method step, the obtained mixture of the protein-containing fraction and the carrier is subjected in a molding device to a molding process which results in the formation of a molded product of a protein-containing fraction.

Through the use provided according to the invention of at least one carrier which is blended with the protein-containing fraction obtained in method step b), it is possible in a surprising an advantageous manner to obtain a mixture, in particular a homogeneous mixture, which is characterized in subsequent method steps by a particularly good suitability for molding and drying and, moreover, has a particularly homogenous structure. The procedure according to the invention thus allows obtaining molded products, in particular dried molded products, which exhibit a particularly homogenous structure and high storage stability. Moreover, the obtained products have little or no stickiness at all.

In contrast to the procedure according to the invention, according to which the protein-containing fraction is supported and molded, drying a non-supported and non-molded protein-containing fraction results in considerably increased technical and economical expenditures due to their stickiness and the dust formation developing during drying.

In connection with the present invention, "raw sugar beet juice" is to be understood as the juice or the aqueous sugar-containing medium that can be obtained, in particular, is extracted from beet slices by means of established extraction or pressing methods, e.g., through thermal extraction methods such as counterflow extraction at approximately 65 to 75° C. using the so-called diffusion method, through electroporation-supported extraction methods or pressing methods. Besides sugar (sucrose), this sugar-rich raw sugar beet juice contains also different organic and inorganic constituents of the beet, which are designated as non-sucrose substances.

In connection with the present invention, the "non-sucrose substances" contained in the raw sugar beet juice are to be understood as high-molecular substances such as protein substances, polysaccharides and cell wall components as well as low-molecular organic compounds such as inorganic or organic acids, amino acids and mineral substances. The cell wall components include in particular pectins, lignin, cellulose and hemicellulose. These substances, as well as the protein substances which, besides the proteins, comprise in particular nucleoproteids or glycoproteins, are present as hydrophilic macromolecules in colloidally dispersed form. The organic acids are, for example, lactates, citrates, pectin acid and oxalates. The inorganic acids are, for example sulfates and phosphates.

"Pre-liming" is to be understood as adding lime milk to raw sugar beet juice, in particular up to approximately 0.1 to 0.3 g CaO/100 ml of raw sugar beet juice. During pre-liming, the raw sugar beet juice is alkalized under gentle conditions, wherein the pH value of the raw sugar beet juice is raised from approximately 6 to approximately 11.5. Pre-liming serves for flocculating non-sucrose substances such as pectin and proteins and for precipitating hardly soluble calcium salts.

"Lime milk" is to be understood according to the invention as calcium hydroxide that is formed during the highly exothermic reaction of burnt lime (calcium oxide) with water and is used as liming agent for pre-liming and main liming. Adding lime milk to raw sugar beet juice during pre-liming effects the precipitation or coagulation of non-sucrose substances in the form of a coagulum.

In connection with the present invention, the non-sucrose substances separated in the form of a coagulum in the method step a) by pre-liming and optionally adding flocculant are designated as protein-containing fraction. Said fraction is alkaline and due to its organic nature, is perishable and thixotropic. It behaves like a non-Newtonian fluid; in particular, the viscosity decreases under shear stress, and after the stress is relieved, the initial viscosity is present again.

According to the invention, a "coagulum" is to be understood as agglomerations of the non-sucrose substances in the raw sugar beet juice, which agglomerations are formed due to a flocculation process. The coagulum comprises in particular the insoluble or hardly soluble salts that form through the reaction of the anions of organic or inorganic acids with calcium, and further comprises the precipitated high-molecular sugar beet juice constituents, in particular with hydrophilic character, such as proteins, polysaccharides and cell wall components which normally are distributed in the raw sugar beet juice in a colloidally dispersed manner. In particular, anions such as oxalate, citrate, phosphate, sulfate and pectin acid as well as colloids, in particular pectin, proteins, cellulose and hemicellulose, are present in the coagulum and thus in the protein-containing fraction. The flocculation process is divided into a flocculation in which the aggregation takes place by adsorbing bridge-forming polymers, and into a coagulation in which the aggregation takes place by relieving or reducing repulsive forces. The flocculation speed depends on the temperature, the pH value and the way of adding the lime milk. The precipitation of individual juice ingredients, for example, anions such as oxalate, phosphate, citrate and sulfate as well as colloids such as pectin and protein, takes place in certain pH ranges, wherein within these pH ranges, a densification of the precipitation takes place. The pH value at which a maximum amount of colloids is flocculated and at which the precipitation of insoluble lime salts is almost complete, is designated as optimal flocculation point of pre-liming. If the precipitation takes place at the optimal flocculation point, this results in a uniform stable flocculation of colloidally dispersed, high-molecular juice constituents.

The precipitation and coagulation of pectins and proteins requires a certain temperature-dependent residence time. According to the invention it is provided that pre-liming can be carried out as cold or hot pre-liming. Preferably, cold pre-liming is carried out at a pre-liming temperature of approximately 38 to 40° C. However, according to the invention, there is preferably also the possibility to carry out the addition of the lime milk to the raw sugar beet juice as a hot pre-liming at a temperature of the raw sugar beet juice of from 55° C. to 75° C.

Adding lime milk for pre-liming the raw sugar beet juice is preferably carried out according to the invention as a progressive pre-liming. Progressive pre-liming by gradually increasing the alkalinity or the pH value of the raw sugar beet juice is preferably carried out by slowly feeding the lime milk liming agent or by small interrupted individual lime milk additions, wherein in particular the pH optimum is slowly passed through.

According to the invention it is provided that the progressive alkaline treatment of the raw sugar beet juice during pre-liming can be carried out in counterflow through an already alkalized raw sugar beet juice, for example by means of the carbonation juice concentrate from the carbonation phases. The progressive alkaline treatment in counterflow means that the recirculated juice with higher alkalinity is blended as fast as possible with a juice of lower alkalinity without the possibility that different alkalinity gradients can develop within the mixing zone.

In a further preferred embodiment of the present invention it is provided that subsequent to the method step a), a flocculation is carried out with the aid of, in particular by adding, at least one flocculant in a method step a1). Preferably, the flocculant can be a polymer, e.g., a copolymer. In a particularly preferred embodiment, the flocculant can be a polyanionic flocculant.

According to the invention it is provided in a preferred embodiment to add to the pre-liming juice, after pre-liming and prior to separating the formed coagulum, at least one copolymer as a polyanionic flocculant, e.g., a copolymer from acrylamide and sodium acrylate, in particular with a molar mass of approximately 5 mio. to approximately 22 mio., preferably up to a concentration of from 1 to 8 ppm.

In connection with the present invention, a "flocculant" is to be understood as a substance that influences the zeta potential of particles in colloidal suspensions in such a manner that the particles aggregate to form flocs and, for example after sedimentation, can be removed from the system. Thus, flocculants have to overcome the electrostatic repulsion of the particles that are mostly negatively charged in water. According to the invention, the flocculants can also be sedimentation accelerators. In connection with the present invention, "flocculants" or "sedimentation accelerators" are to be understood as compounds that effect the agglomeration of solids to form larger units or flocs. Due to the agglomeration as flocs, the solids can deposit much faster because of their greater mass. At the same time, the pores between the individual particles are enlarged so that the water in the deposited slurry can easily be removed through filtration or centrifugation. The polyanionic flocculants preferably used according to the invention have no coagulating effect at all because they do not influence the dispersion of the particles in the liquid phase, but rather effect the aggregation of the particles by absorbing bridge-forming polymers.

The copolymers from acrylamide and sodium acrylate used according to the invention as polyanionic flocculants in a preferred embodiment are synthetic organic water-soluble polyelectrolytes with a relatively high molecular weight of approximately 5 mio. to approximately 22 mio. These compounds are ionic to a medium to high extent. Particularly preferred, the products 2440 and 2540 (company Stockhausen) as well as AN 945 (company Clarflok) are used as flocculants.

It is provided according to the invention to separate after a sufficient residence time the coagulum, that has formed during pre-liming and optionally by using a flocculant, from the pre-liming juice, wherein a first separation device is used for this purpose. According to the invention, a "separation device" is in particular to be understood as device for solid/liquid separation. The solid/liquid separation is based on mechanical methods which are based on the utilization of gravitational force, centrifugal force, pressure or vacuum. Solid/liquid separation methods on which the principle of operation of the separation device used according to the invention is based comprise, for example, decantation, filtration, sedimentation, clarification and centrifugation.

In a preferred embodiment of the invention, a decanter, in particular a static or dynamic decanter is used as a first separation device. A "decanter", in particular a static or dynamic decanter, is to be understood as a device or apparatus that serves for mechanically removing sedimented substances from a liquid with the aid of gravitational force according to the sedimentation principle.

According to the invention it is provided in particular in a preferred embodiment that when using a decanter as a first separation device, 1 to 3 ppm of flocculant is added to the pre-liming juice.

In a further preferred embodiment of the invention, a centrifuge is used as a first separation device. A centrifuge is to be understood as a device for separating mixtures of substances through utilization of the centrifugal force. The material to be separated inside the rotating centrifuge is exposed to the so-called centrifugal force. The centrifuge used as a first separation device is preferably a disc centrifuge or a decanting centrifuge. According to the invention, a "disc centrifuge" or a "disc separator" is to be understood as a centrifuge that has rotating conical baffle plates on which the heavier components are directed outward while the lighter components accumulate near the axle from where they are directed outward. According to the invention, a "decanting centrifuge" is to be understood as a mostly conical screw discharge centrifuge that frequently operates continuously.

According to the invention it is in particular provided that 1 to 8 ppm of flocculant is added to the pre-liming juice, e.g., when using a disc centrifuge or decanting centrifuge as a first separation device.

In a particularly preferred embodiment it is provided that the protein-containing fraction is freed from liquid medium by the first separation device to such an extent that said fraction has a dry matter content of from 30 to 50% by weight, preferably 32 to 48% by weight, preferably 35 to 45% by weight and in particular 37 to 40% by weight (unless otherwise specified, dry matter contents in the present teaching are based on the weight of the total composition). However, in a particularly preferred embodiment it can also be provided that the desired dry matter content is not already achieved after the first separation device, but only after passing through a second separation device.

In a further preferred embodiment of the invention, accordingly, it is provided that the coagulum separated from the clear pre-liming juice by using the first separation device is optionally further concentrated and thickened in a method step 1b) by using at least one second separation device.

According to the invention, preferably, further thickening and concentrating of the coagulum is carried out by using at least one second separation device in the form of a membrane filter press (or presses) (vertical cake discharge) or one or a plurality of press filter apparatuses (horizontal cake discharge). In connection with the present invention, a "membrane filter press" is to be understood as a filter device that is constructed as a frame filter press or as a chamber filter press.

According to the invention, preferably, the coagulum obtained by using the first separation device can also be further thickened and concentrated by using one or a plurality of decanting centrifuges, one or a plurality of rotary vacuum filters and/or disc separators as the second separation device.

In a particularly preferred embodiment it is provided that subsequent to method step b), the separated coagulum is concentrated in a method step b1) to a dry matter content of from 30 to 50% by weight, preferably 32 to 48% by weight, preferably 35 to 45% by weight, in particular 37 to 40% by weight by using a second separation device.

The clear pre-liming juices obtained through the separating steps using the first and second separation devices are preferably combined and then subjected to main liming.

In a preferred embodiment, the carrier used in method step c) is a carrier that is present in dried form, in particular in dried and comminuted form, in particular in ground or granulated form.

In a particularly advantageous and preferred manner according to the invention, the carrier used in method step c) can be present in the form of dried sugar beet slices, NTT slices, cyclone dust, gluten or a dried protein-containing fraction.

In connection with the present invention, NTT slices are to be understood as molassed dried low-temperature slices, in particular such slices which prior to adding molasses have a dry matter content of from 38 to 44% by weight and after adding molasses have a dry matter content of from 42 to 48% by weight.

In connection with the present invention, cyclone dust is to be understood as the particles that are radially separated from a gas flow through inertial forces.

In connection with the present invention, gluten is to be understood as a mixture of proteins that is found in grain seeds.

In a preferred embodiment of the present invention, the carrier used in method step c), in particular the dried sugar beet slices or the dried protein-containing fraction can be present in comminuted, in particular in ground or granulated form.

Thus, the invention provides in a particularly preferred embodiment that as a carrier, a dried protein-containing fraction is used, preferably such a fraction that has been produced by means of the inventive method itself, thus is in particular a comminuted, optionally, ground molded product produced according to the invention.

In a further preferred embodiment of the present invention it is provided that the dry matter content of the carrier used in step c) is 85 to 99% by weight, in particular 88 to 95% by weight.

In a further preferred embodiment it is provided that the weight ratio of the protein-containing fraction to the at least one carrier in method step c) is (2 to 12):1, preferably (6 to 12):1, preferably (7 to 11):1, in particular (8 to 10):1, and preferably is 9:1 (unless otherwise specified, weight ratios in the present teachings are in each case determined from percent by weight based on the total weight).

In a particularly preferred embodiment, the weight ratio of the protein-containing fraction to the dried sugar beet slices, here also designated as dried slices, is (8 to 10):1, in particular 9:1. In a particularly preferred embodiment, a weight ratio of protein-containing fraction to dried slices is used that results in a total dry matter content of the obtained mixture of from 40 to 60% by weight, in particular 40 to 55% by weight, preferably to 55% by weight, in particular 43 to 55% by weight, in particular 43 to 53% by weight, preferably 42 to 53% by weight, in particular 50 to 55% by weight and preferably 52 to 54% by weight.

In a particularly preferred embodiment, the weight ratio of the protein-containing fraction to the NTT slices is (4 to 8):1, in particular (5 to 6):1. In a particularly preferred embodiment, a weight ratio of protein-containing fraction to NTT slices is used that results in a total dry matter content of the obtained mixture of from 40 to 60% by weight, in particular 40 to 55% by weight, preferably 40 to 50% by weight, and in particular 40 to 45% by weight.

In a further preferred embodiment it is provided that the weight ratio of the protein-containing fraction to cyclone dust is (8 to 10):1, in particular 9:1. In a particularly preferred embodiment, a weight ratio of the protein-containing fraction to the cyclone dust is used that results in a total dry matter content of the obtained mixture of from 40 to 60% by weight, in particular 40 to 55% by weight, preferably 42 to 55% by weight, in particular 43 to 55% by weight, in particular 43 to 53% by weight, preferably 42 to 53% by weight, in particular 50 to 55% by weight, preferably 52 to 54% by weight.

In a further preferred embodiment of the present invention it is provided that the weight ratio of the protein-containing fraction to the dried protein-containing fraction is (2 to 4):1, preferably 3:1. In a particularly preferred embodiment, a weight ratio of the protein-containing fraction to the dried protein-containing fraction is used that results in a total dry matter content of the obtained mixture of from 40 to 60% by weight, in particular 40 to 55% by weight, preferably 42 to 55% by weight, in particular 43 to 55% by weight, in particular 43 to 53% by weight, preferably 42 to 53% by weight, in particular 50 to 55% by weight, preferably 52 to 54% by weight.

In a particularly preferred embodiment it is provided that the particle size of the carrier used, in particular of the dried slices, is a maximum of 3 mm, in particular 0.5 to 3 mm. In a further preferred embodiment it is provided that in the mixture, produced in method step c), of the carrier, in particular dried slices, and the protein-containing fraction no more than 20% by weight of dried slices in dried and ground form is present.

In a particularly preferred embodiment it is provided that the particle size of the carrier used, in particular the dried and ground protein-containing fractions, is a maximum of 1.5 mm, in particular 0.5 to 1.5 mm.

In a further preferred embodiment it is provided that the dry matter content of the mixture, obtained in method step c), of the protein-containing fraction with the at least one carrier is to 60% by weight, in particular 40 to 55% by weight, preferably 42 to 55% by weight, in particular 43 to 55% by weight, in particular 43 to 53% by weight, preferably 42 to 53% by weight, in particular 50 to 55% by weight, preferably 52 to 54% by weight.

In a particularly advantageous and preferred embodiment of the present invention, the molding device used in method step d) is a device for pelleting, a device for granulating or a device for extruding, in particular a pelleting machine, a pellet press or a granulating auger. Accordingly, a molded product in the form of pellets, granules, bars or extrudates is obtained.

In a further preferred embodiment of the present invention it is provided that subsequent to the method step d), drying the obtained molded product of a protein-containing fraction is carried out in a method step d1). In a preferred embodiment of the present invention, drying is carried out as mechanical drying, thermal drying or mechanical and thermal drying. In a preferred embodiment, mechanical drying is provided by using decanting centrifuges. In a particularly preferred embodiment, thermal drying is carried out in method step d1) at 60 to 90° C., preferably 60 to 80° C., preferably 65 to 85° C., in particular 70 to 80° C. In a particularly preferred embodiment, drying in method step d1) is carried out up to a dry matter content of the molded product of a protein-containing fraction of at least 88% by weight, at least 90% by weight, at least 92% by weight, at least 93% by weight, at least 95% by weight, at least 99% by weight.

In a further preferred embodiment of the present invention it is provided that the obtained molded product is comminuted, e.g., ground or granulated in a method step d2) that follows the method step d) or d1). In a preferred embodiment, a powder or granulate is obtained.

The produced molded products particularly advantageously have a very homogeneous structure, they are storage-stable and are not sticky.

In a further preferred embodiment of the present invention it is provided that the at least one carrier used in method step c) is the molded product, in particular in dried and comminuted form, e.g., ground form, obtained in method step d) or in the subsequent method step d1) or d2). Accordingly, in a particularly preferred embodiment, the invention provides recirculation or recycling of portions of the obtained molded products, wherein these portions are particularly advantageously suitable as carrier for mixing with a protein-containing fraction obtained from raw sugar beet juice.

In a further embodiment, the invention also relates to molded products that can be obtained by means of the method according to the invention. Such molded products are characterized by their particular content of protein-containing fraction, in particular non-sucrose substances, and are additionally characterized by a particularly stable and homogeneous structure that is little to not at all sticky.

Molded products produced according to the invention are particularly suitable for ensilage, as animal feed, as fermentation medium, in particular for fungi, bacteria or other microorganisms, as combustion aid, as fuel itself, as soil conditioner or fertilizer. When use as feedstuff, the non-sucrose concentrate according to the invention is preferably comminuted, mixed with molasses and dried and then used as feedstuff.

Further advantageous configurations arise from the sub-claims.

DESCRIPTION OF THE DRAWINGS

The invention is explained in more detail by means of the FIGS. 1 and 2 and the example.

DETAILED DESCRIPTION

Figure 1:
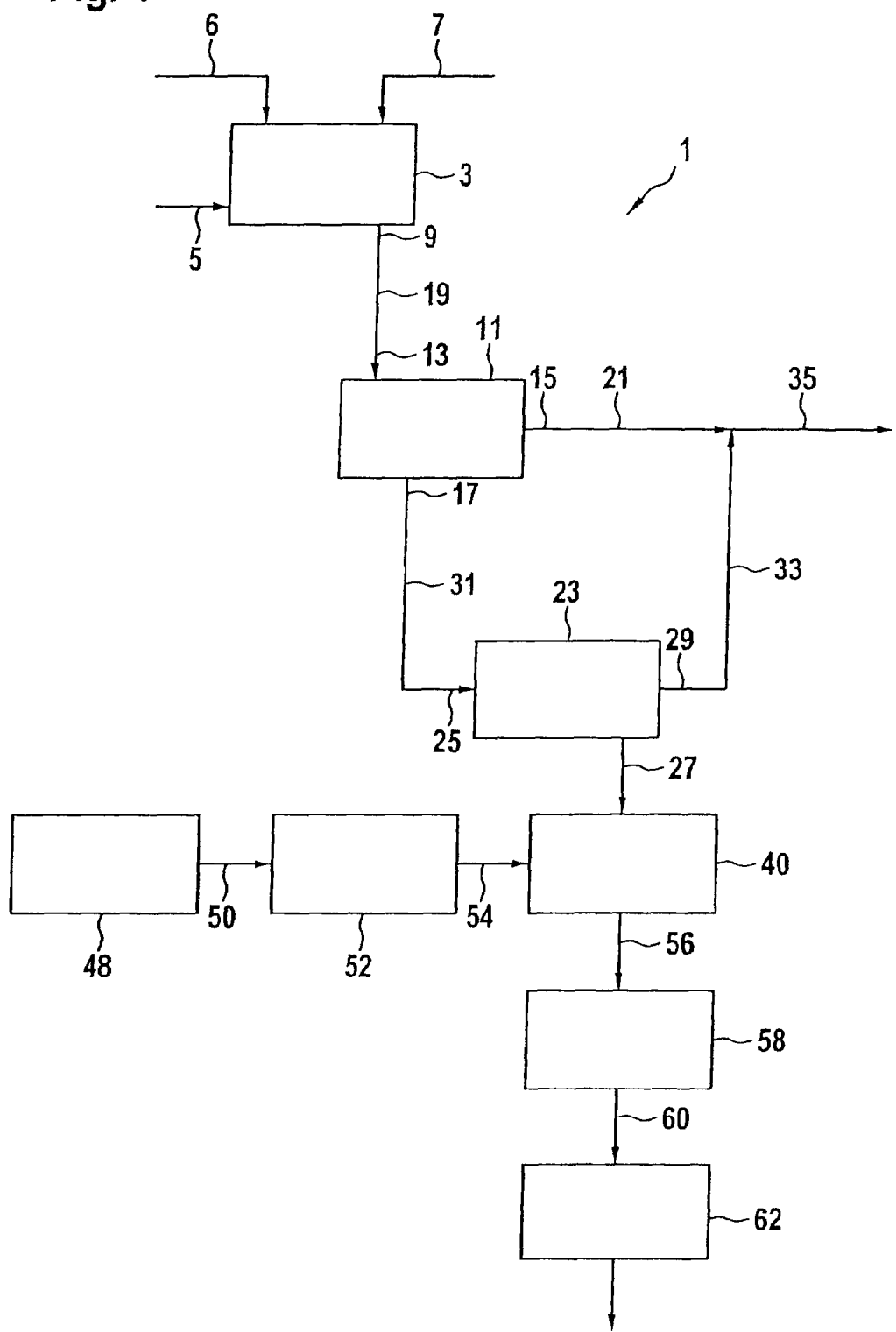
FIG. 1 is a schematic illustration of an embodiment of the device according to the invention for producing a molded product of a protein-containing fraction from raw sugar beet juice.

The device 1 according to the invention comprises a container 3 for lime milk treatment of the raw sugar beet juice and a first separation device 11 connected thereto for separating the coagulum obtained during pre-liming in the container 3 from the pre-liming juice. Besides the inlet 5 for the raw juice and the inlet 7 for the lime milk, the container 3 has also an inlet 6 for introducing carbonatation juice concentrate from the first and second carbonatations, which are no illustrated. The container 3 also has an outlet 9 for discharging the obtained pre-liming juice. The outlet 9 of the pre-liming container 3 is connected to the inlet 13 of the first separation device 11 via a line 19 so that the pre-liming juice gets from the pre-liming container 3 into the first separation device 11. In the first separation device 11, the coagulum formed in the pre-liming juice is separated as coagulum slurry from the clear pre-liming juice. The cleared pre-liming juice is transported out of the first separation device 11 via the outlet 15. The separated coagulum slurry is transported out of the first separation device 11 via the outlet 17. The outlet 17 is connected to the inlet 25 of the optionally present second separation device 23 via the line 31 so that the coagulum slurry gets from the first separation device 11 into the second separation device 23 via the outlet 17, the line 31 and the inlet 25. In the second separation device 23, the coagulum slurry introduced therein is concentrated, wherein a concentrated coagulum slurry with a dry matter content of, for example, 40% by weight and further clear pre-liming juice are obtained. The concentrated coagulum slurry, thus the protein-containing fraction, is transported via the line 27 from the second separation device 23 into the mixing device 40. From the container 48, in which dried beet slices are located, the dried beet slices are placed via a conveying device 50 into a comminuting device 52 in which the slices are ground into a particle size of, for example, smaller than 3 mm with a dry matter of, for example, 90% by weight. The ground and dried slices are subsequently introduced via the conveying device 54 into the mixing device 40 and are mixed there homogeneously and thoroughly with the protein containing fraction. The obtained mixture with a dry matter content of, for example, 44 to 45% by weight is introduced via the conveying device 56 into the molding device 58, which is constructed as a pelleting machine, and pellets with a dry matter content of, for example, 44 to 45% by weight are obtained. Subsequently, the pellets are dried to a dry matter content of, for example, 89% by weight in a drying device 62 into which the pellets were transported via a conveying device 60.

The clear pre-liming juice formed in the second separation device 23 is transported via the outlet 29 out of the second separation device 23 and is fed via the line 33 connected thereto to the line 21 in which the clear pre-liming juice from the first separation device 11 is transported. The mixture of the clear pre-liming juices from the first separation device 11 and the second separation device 23 is then conveyed jointly to the main liming operation via the line 35 and via heat exchangers, which are not illustrated here.

Figure 2:
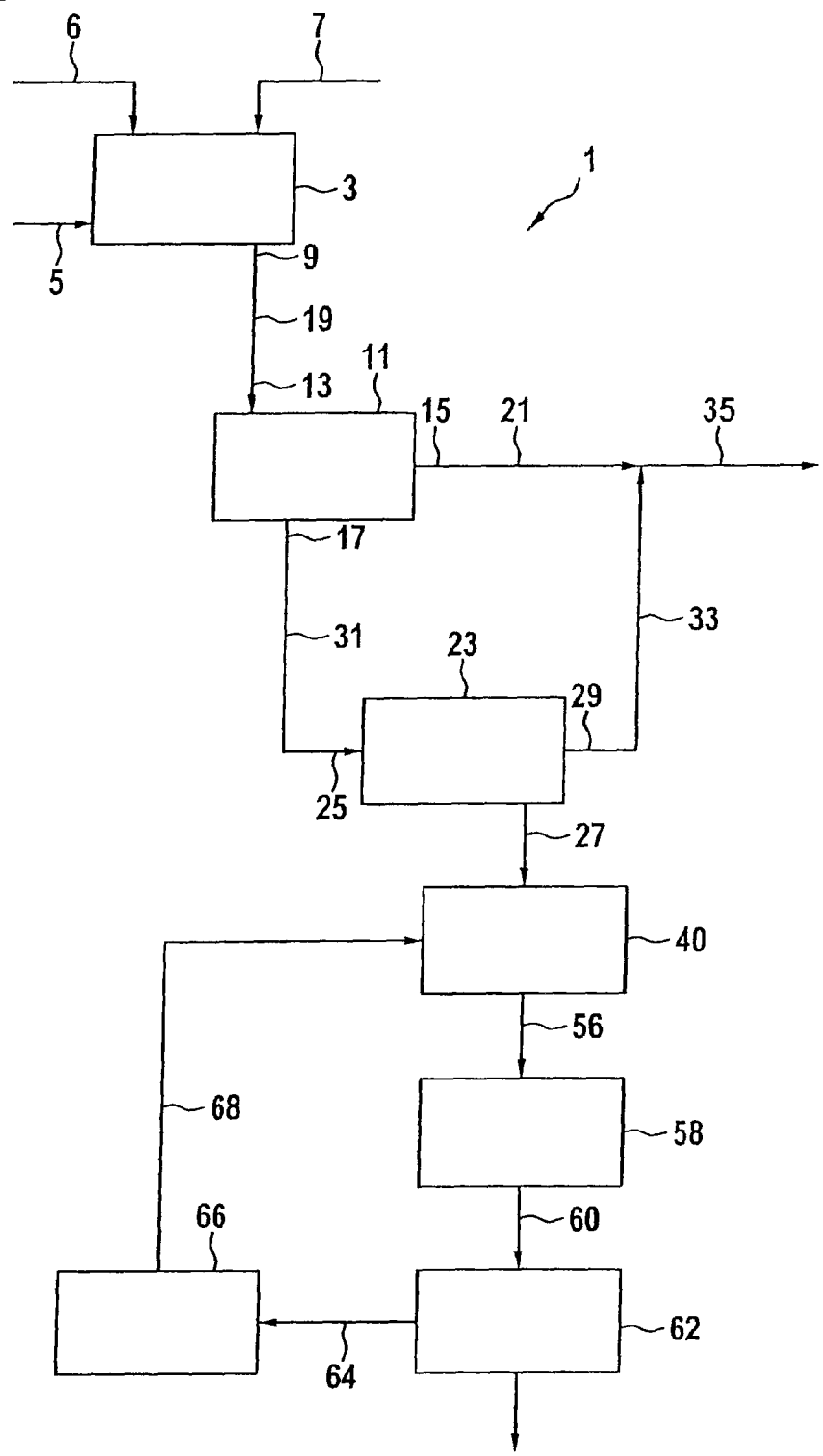
FIG. 2 is another schematic illustration of an embodiment of the device according to the invention for producing a molded product of a protein-containing fraction from raw sugar beet juice.

FIG. 2 corresponds substantially to FIG. 1, wherein, however, instead of devices for feeding dried and ground sugar beet slices, devices for recycling dried protein-containing fraction are present, which protein-containing fraction is used as a carrier instead of the dried and ground sugar beet slices.

Accordingly, in the mixing device 40, a mixture is produced of the protein-containing fraction that has a dry matter content of, for example, 40% and comes from the optionally available second separation device 23 and of dried and ground protein-containing fraction that has a dry matter content of, for example 89% by weight and is obtained through said method. After mixing these two components, they are introduced with a dry matter content of, for example, 49 to 59% by weight via the conveying device 56 into the molding device 58, in particular a device for pelleting, are transported via the conveying device 60 into a drying device 62 and are dried there to a dry matter content of, for example, 89%. A portion of the dried pellets obtained in this manner is introduced via a conveying device 64 into a comminuting device 66 and is comminuted there to a particle size of, for example, smaller than 1.5 mm and is subsequently recycled as a carrier into the mixing device 40 via a conveying device 68. The other portion of the pellets can be put to advantageous final use.

EXAMPLE

Separating Pre-Liming Coagulum
Pre-Liming 30 kg of raw juice is filled into a heatable container 3 that has a volume of 50 l and comprises a stirring unit, a $CO_2$ feeding tube and a pH electrode, and is heated to 55° C. Over a period of 20 min, lime milk is gradually added to the raw juice up to the pH value of the optimal flocculation point of pre-liming (ca. 0.1 to 0.3 g CaO/100 ml of juice). In order to increase the sedimentation speed, subsequently, a polyanionic flocculant (Praestol 2540 TR) is added. The formed clear supernatant (clear juice) is discharged into a storage container. The formed carbonatation juice concentrate is drained and is fed to a first, and here the only, separation device 11, for example, a membrane filter press or a decanting centrifuge, in which the protein-containing fraction is obtained.

The protein-containing fraction, when freshly separated, has a temperature of approximately 50° C. The pH value lies within the basic range at approximately 11. Since the product involves an organic compound, it is perishable and if it is not immediately processed, it has to be stored refrigerated. The dry matter content (TS) of the fraction ranges approximately between 35 to 41%. The protein-containing fraction has a sugar content of 8 to 10%.

Further ingredients are phosphor (P), calcium (Ca), sodium (Na), potassium (K), lead (Pb), zinc (Zn), magnesium (Mg) and colloids such as, e.g., pectin, protein, cellulose and hemicellulose. Under shear stress in the extruder, the protein-containing fraction shows a thixotropic behavior; thus, it is a non-Newtonian fluid. In the case of non-Newtonian fluids, the viscosity decreases at constant shear stress over time (a Newtonian fluid behaves proportional to the shear stress; it is independent of speed). Once the stress is relieved, the medium recovers its initial viscosity.

The mixing ratio of dried protein-containing faction, beet slices (dried slices) or cyclone dust to the protein-containing fraction obtained from the first separation device 11 is specified to be 5, 10 and 15%.

Prior to mixing with the protein-containing fraction, the dried slices used as a carrier are classified with a screen that has a mesh size of 5×5 mm since the slices are in some cases larger than 3 cm. Classifying results in a uniform mixture.

Preferably, the particle size of dried slices is approximately 3 mm.

For mixing the components, an agitator 40 is available which is connected to a stirring unit. The protein-containing fraction and the dried slices (but also cyclone dust or the dry protein-containing fraction) are put into the container 40 and subsequently mixed for approximately 5 minutes.

Mixtures of 90% by weight of protein-containing fraction (dry matter content 39.5% by weight) and 10% by weight of dried slices (92.0% by weight of dry matter) were produced with a dry matter content of 44.8% by weight.

A second mixture of 90% by weight of protein-containing fraction (38.0% by weight of dry matter) and 10% by weight of cyclone dust (95.7% by weight of dry matter) was produced, and the mixture had a dry matter content of 43.8% by weight.

A third mixture of 75% by weight of protein-containing fraction (total dry matter content 38.0% by weight) and 25% by weight of dried protein-containing fraction (95% by weight of dry matter) from the method according to the invention was produced, and the mixture had a dry matter content of 52.3% by weight.

A fourth mixture of 90% by weight of protein-containing fraction and 10% by weight of cyclone dust (95% by weight of dry matter) was produced. A fifth mixture of 90% by weight of protein-containing fraction and 10% by weight of dried slices (93.8% by weight of dry matter) was produced. A sixth mixture of 70% by weight of protein-containing fraction and 30% by weight of dried protein-containing fraction (92.8% by weight of dry matter) from the method according to the invention was produced. The portion insoluble in hydrochloric acid (25%), thus the mineral ash content containing sodium, potassium, heavy metals, chloride, sulfate and sand (silicate), was 11.33 g/100 g TS (dry matter) for the fourth mixture, 9.56 g/100 g TS (dry matter) for the fifth mixture and 8.59 g/100 g TS (dry matter) for the sixth mixture. The fifth and sixth mixtures with dried slices and a protein-containing fraction have a particularly low ash content for the use, e.g., as feedstuff.

The following further mixtures according to the Table were produced and characterized:

TABLE

| Mixture | Diameter (mm) | Density (t/m$^3$) |
|---|---|---|
| protein-containing fraction | 5 | 1.352 |
| protein-containing fraction | 17 | 1.140 |
| protein-containing fraction | 25 | 1.086 |
| protein-containing fraction and dried slices (10%) | 5 | 1.076 |
| protein-containing fraction and cyclone dust (5%) | 5 | 1.133 |
| protein-containing fraction and cyclone dust (10%) | 5 | 1.132 |
| protein-containing fraction and cyclone dust (15%) | 5 | 1.148 |

Densifying Pellets of Different Mixtures

The obtained mixtures are then formed into pellets by means of an extruder. Subsequently, the obtained pellets are dried in a drying cabinet.

The pellets obtained from the aforementioned mixtures exhibit a very homogenous structure, good drying and molding properties and, as storage tests show, are very storage-stable and little to not at all sticky.

The invention claimed is:
1. A method for producing a molded product of a protein-containing fraction from raw sugar beet juice, the method comprising:
 a) pre-liming the raw sugar beet juice in order to form a coagulum of non-sucrose substances forming in the obtained pre-liming juice, b) separating the coagulum from the pre-liming juice using at least one first separation device in order to obtain a protein-containing fraction, c) blending the protein-containing fraction with at least one carrier that is present in dried form to obtain a mixture, and d) molding the obtained mixture comprising the protein-containing fraction and the carrier in a molding device to obtain a molded product of a protein-containing fraction.

2. The method according to claim 1, wherein subsequent to method step a), a flocculation is carried out in a method step a1) by adding at least one flocculant.

3. The method according to claim 1, wherein subsequent to the method step b), the separated coagulum is concentrated in a method step b1) to a dry matter content of from 35 to 45% by weight by using a second separation device.

4. The method according to claim 1, wherein the dry matter content of the at least one carrier is 85 to 99% by weight.

5. The method according to claim 1, wherein the weight ratio of the protein-containing fraction to the at least one carrier in method step c) is (2 to 12):1 (in each case percent by weight of the total weight).

6. The method according to claim 1, wherein a dry matter content of the mixture obtained in method step c) is 40 to 55% by weight.

7. The method according to claim 1, wherein subsequent to the method step d), drying the obtained molded product of a protein-containing fraction is carried out in a method step d1).

8. The method according to claim 7, wherein drying in method step d1) is carried out at 60 to 90° C.

9. The method according to claim 7, wherein drying in method step d1) is carried out up to a dry matter content of the molded product of a protein-containing fraction of at least 88% by weight.

10. The method according to claim 7, wherein the obtained molded product is comminuted in a method step d2) that follows the method step d) or d1).

11. The method according to claim 1, wherein the at least one carrier used in method step c) is the molded product obtained in method step d).

12. The method according to claim 1, wherein the molding device is a device for pelleting, a device for granulating or a device for extruding.

13. The method according to claim 1, wherein the at least one carrier that is present in dried form has particle sizes of from 0.5 mm to 3 mm.

14. The method according to claim 1, wherein the blending the protein-containing fraction with at least one carrier that is present in dried form comprises blending the protein-containing fraction with the at least one carrier until a homogeneous mixture is obtained.

15. The method according to claim 1, wherein the molded product of a protein-containing fraction is homogenous and not sticky.

16. The method according to claim 1, further comprising granulating the molded product of a protein-containing fraction into a powder or granulate in a method step d2) that follows the method step d) or d1); and repeating the method wherein the powder or granulate is the at least one carrier in method step c).

17. The method according to claim 1, wherein the at least one carrier comprises a granulated form of a molded product of a protein-containing fraction that was obtained by a previous performance of the method.

18. A method for producing a molded product of a protein-containing fraction from raw sugar beet juice, the method comprising:

a) pre-liming the raw sugar beet juice in order to form a coagulum of non-sucrose substances forming in the obtained pre-liming juice, b) separating the coagulum from pre-liming juice using at least one first separation device in order to obtain a protein-containing fraction, c) blending the protein-containing fraction with at least one carrier, wherein the at least one carrier is dried sugar beet slices, NTT slices, cyclone dust, gluten or dried protein-containing fraction, and d) molding the obtained mixture comprising the protein-containing fraction and the carrier in a molding device to obtain a molded product of a protein-containing fraction.

* * * * *